United States Patent
Jaber et al.

(10) Patent No.: US 10,868,684 B2
(45) Date of Patent: Dec. 15, 2020

(54) PROACTIVE SUGGESTION FOR SHARING OF MEETING CONTENT

(71) Applicant: Microsoft Technology Licensing, LLC, Redmond, WA (US)

(72) Inventors: Rayyan Jaber, Seattle, WA (US); Jackson Cowan, Seattle, WA (US); Kevin Tomas Hernandez, Redmond, WA (US); Guangcai Wang, Redmond, WA (US); Gregory Powell Young, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 18 days.

(21) Appl. No.: 16/222,698

(22) Filed: Dec. 17, 2018

(65) Prior Publication Data

US 2020/0145240 A1    May 7, 2020

Related U.S. Application Data

(60) Provisional application No. 62/755,254, filed on Nov. 2, 2018.

(51) Int. Cl.
*G06F 15/16*    (2006.01)
*H04L 12/18*    (2006.01)
*H04L 29/08*    (2006.01)

(52) U.S. Cl.
CPC ...... *H04L 12/1818* (2013.01); *H04L 67/1097* (2013.01)

(58) Field of Classification Search
USPC ........................................................ 709/204
See application file for complete search history.

(56) References Cited

U.S. PATENT DOCUMENTS

| 7,703,013 | B1* | 4/2010 | Bauermeister | G06F 16/957 715/255 |
| 9,531,823 | B1* | 12/2016 | Suchland | H04L 67/22 |
| 2009/0119246 | A1* | 5/2009 | Kansal | G06F 16/48 |
| 2009/0181659 | A1* | 7/2009 | Stalnacke | H04L 12/66 455/416 |

(Continued)

OTHER PUBLICATIONS

"International Search Report and Written Opinion Issued in PCT Application No. PCT/US19/057508", dated Jan. 16, 2020, 12 Pages.

*Primary Examiner* — Anthony Mejia

(57) ABSTRACT

The present disclosure relates to processing operations configured for management of proactive suggestion(s) that may be utilized to manage the sharing of meeting content. The present disclosure further describes optimization of a user interface whereby a user interface experience is improved through new user interface features and actions that enable proactive presentation of suggestions for syncing content with a meeting as well as sharing synced content. Various intelligent signals such as user's calendar, GPS location, camera roll content, capture content (including OCR, whiteboard detection, etc.) and capture time, are collected and analyzed to make smart suggestions to the user to share content with specific set of people (e.g., those involved in meeting). Processing described herein enables contextual correlation between specific content and a scheduled meeting, whereby results of that contextual correlation can be used to execute programmed actions to improve efficiency for computing devices and users.

20 Claims, 11 Drawing Sheets

(56) References Cited

U.S. PATENT DOCUMENTS

| | | | | |
|---|---|---|---|---|
| 2011/0040834 A1* | 2/2011 | Schaefer | .............. | G06Q 10/109 |
| | | | | 709/204 |
| 2012/0191500 A1* | 7/2012 | Byrnes | ............... | G06Q 10/1095 |
| | | | | 705/7.19 |
| 2012/0209906 A1* | 8/2012 | Ausfeld | .................. | H04L 41/22 |
| | | | | 709/204 |
| 2013/0110925 A1* | 5/2013 | Wessling | .............. | G06Q 10/109 |
| | | | | 709/204 |
| 2013/0145284 A1* | 6/2013 | Anantharaman | ....... | H04L 63/10 |
| | | | | 715/753 |
| 2013/0286223 A1* | 10/2013 | Latta | .................. | H04N 1/00347 |
| | | | | 348/207.1 |
| 2013/0290416 A1* | 10/2013 | Nelson | .............. | H04L 29/06972 |
| | | | | 709/204 |
| 2013/0347055 A1* | 12/2013 | Motoyama | .............. | G06F 21/60 |
| | | | | 726/1 |
| 2014/0365568 A1* | 12/2014 | Huang | ............... | H04L 65/1089 |
| | | | | 709/204 |
| 2016/0189107 A1* | 6/2016 | Liu | ......................... | G10L 15/26 |
| | | | | 704/214 |
| 2017/0075503 A1* | 3/2017 | Chakra | ................ | H04M 3/567 |
| 2018/0276593 A1* | 9/2018 | Perret | .................... | H04L 51/32 |
| 2018/0332130 A1* | 11/2018 | Miranda-Steiner | .... | G06Q 10/10 |
| 2019/0073640 A1* | 3/2019 | Udezue | .............. | H04L 12/1818 |
| 2019/0097824 A1* | 3/2019 | Barr | .................... | H04L 12/1818 |
| 2019/0171734 A1* | 6/2019 | Furuta | ................ | G06F 16/5846 |
| 2020/0045090 A1* | 2/2020 | Baba | .................. | H04L 65/4015 |
| 2020/0145240 A1* | 5/2020 | Jaber | ...................... | G06F 3/048 |

\* cited by examiner

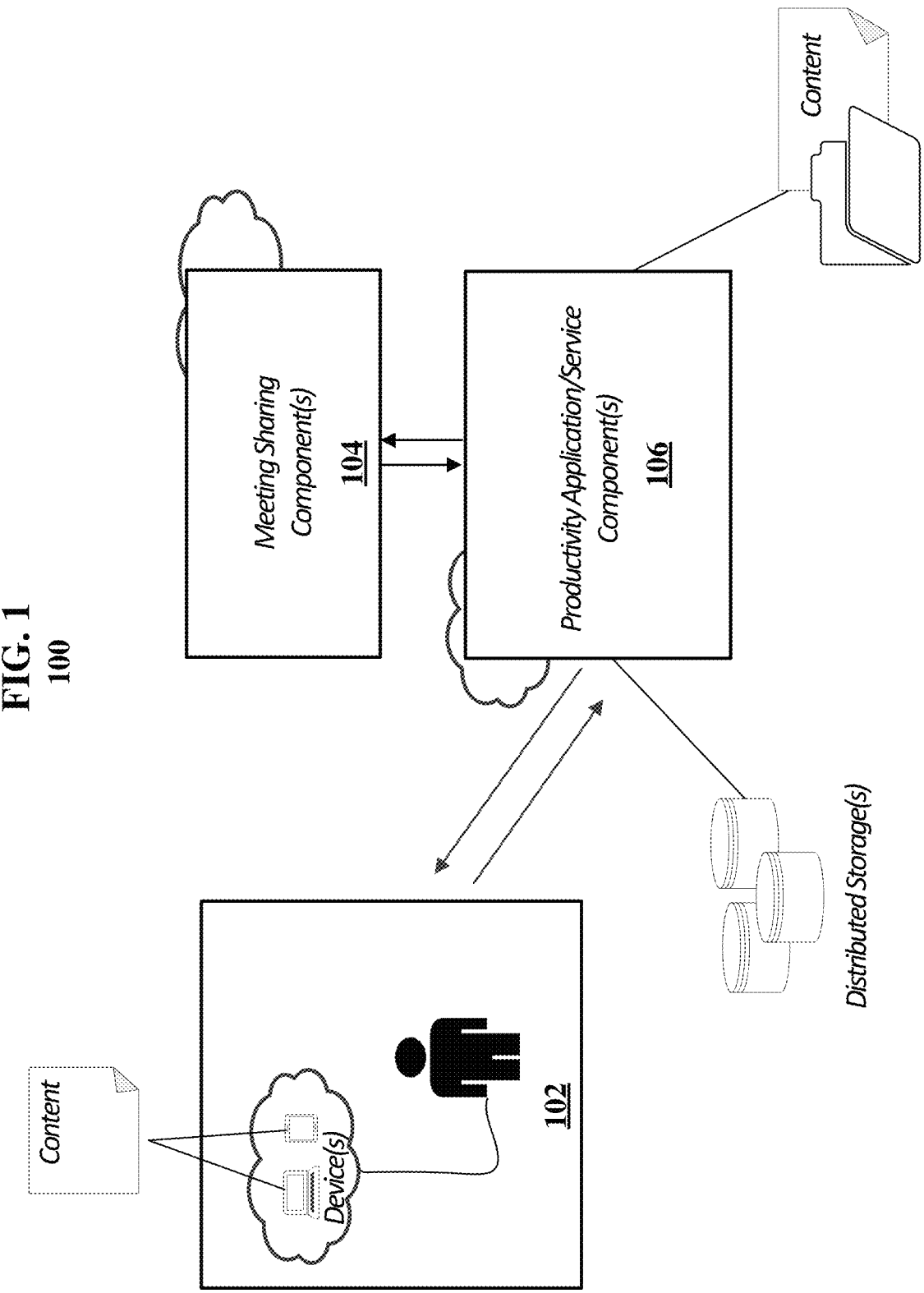

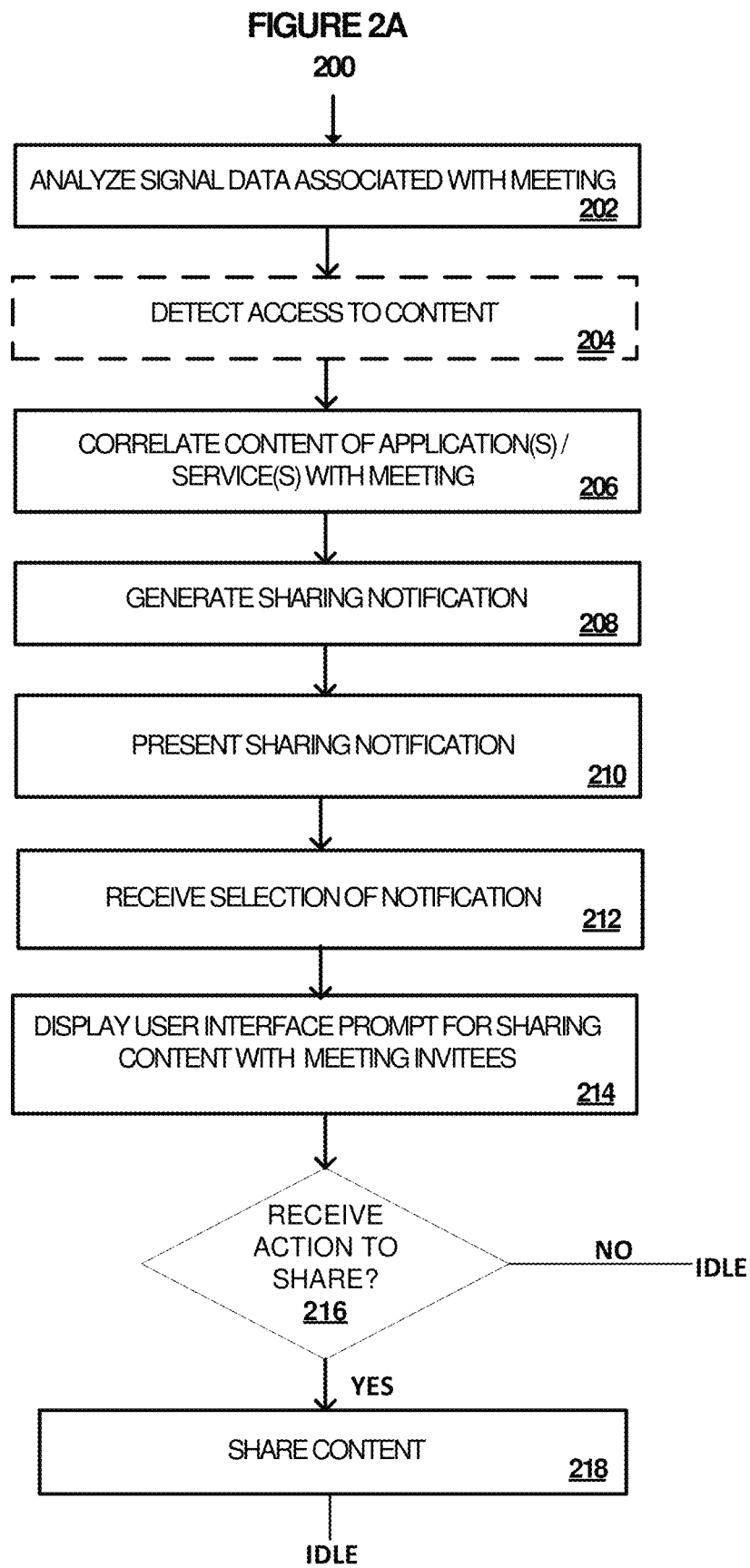

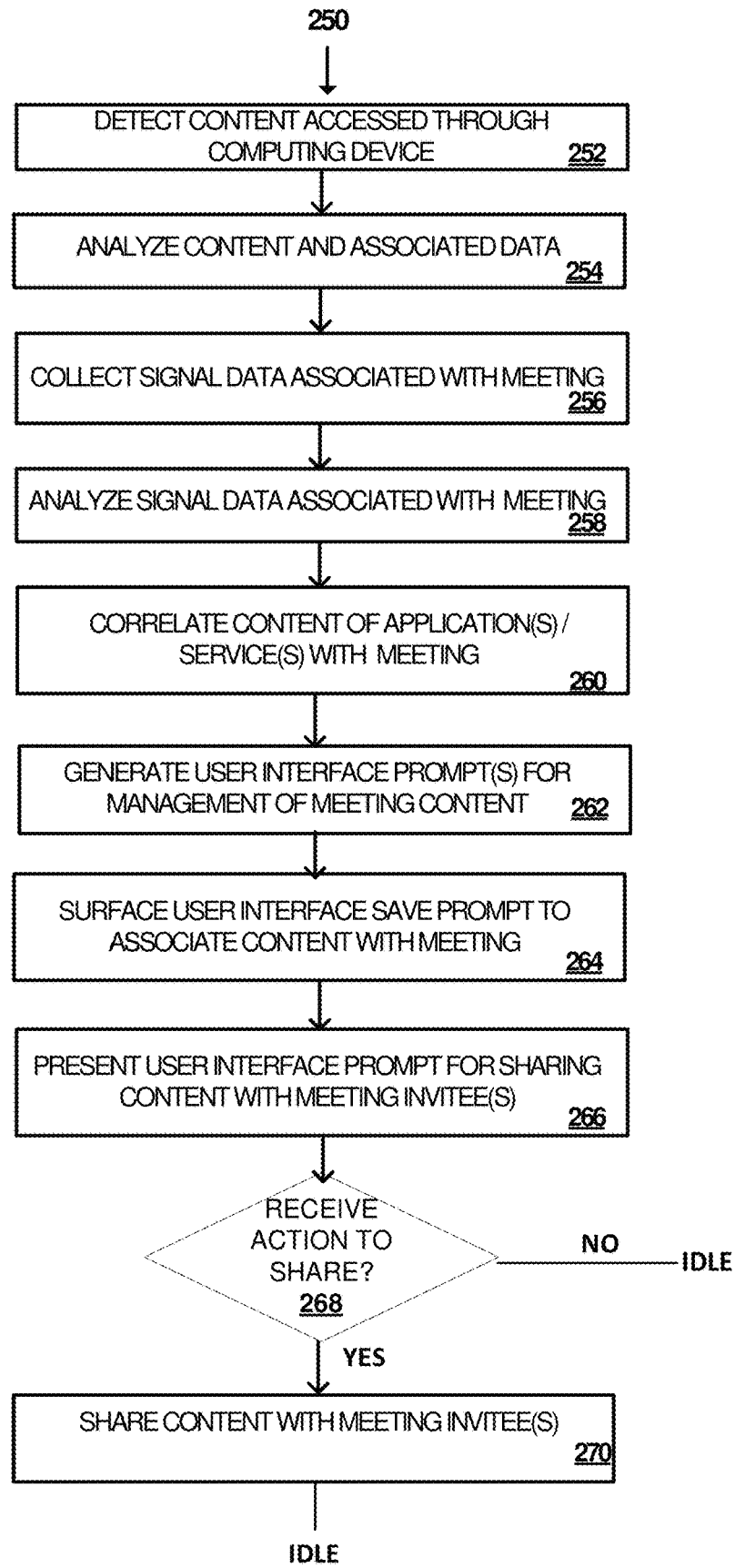

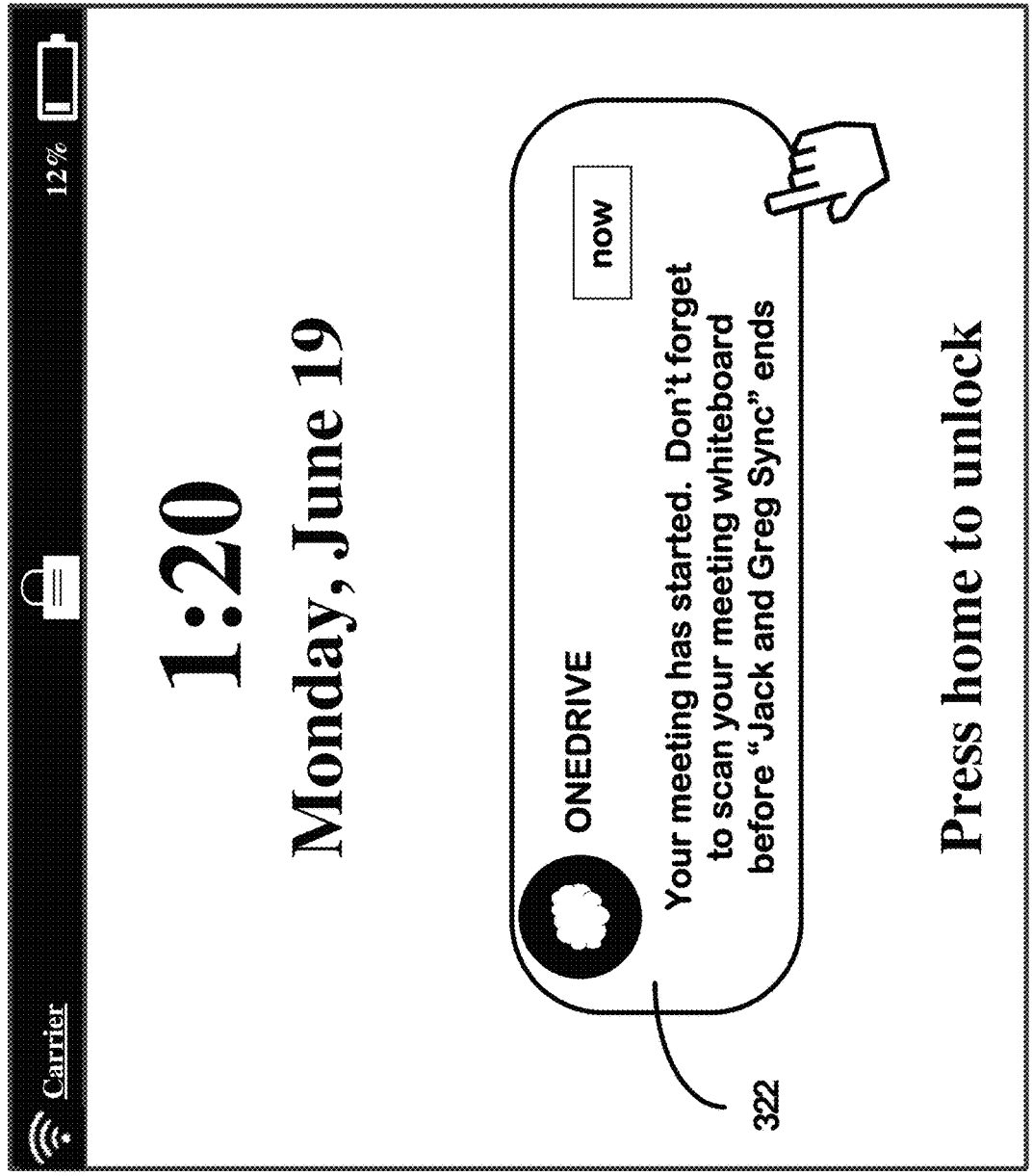

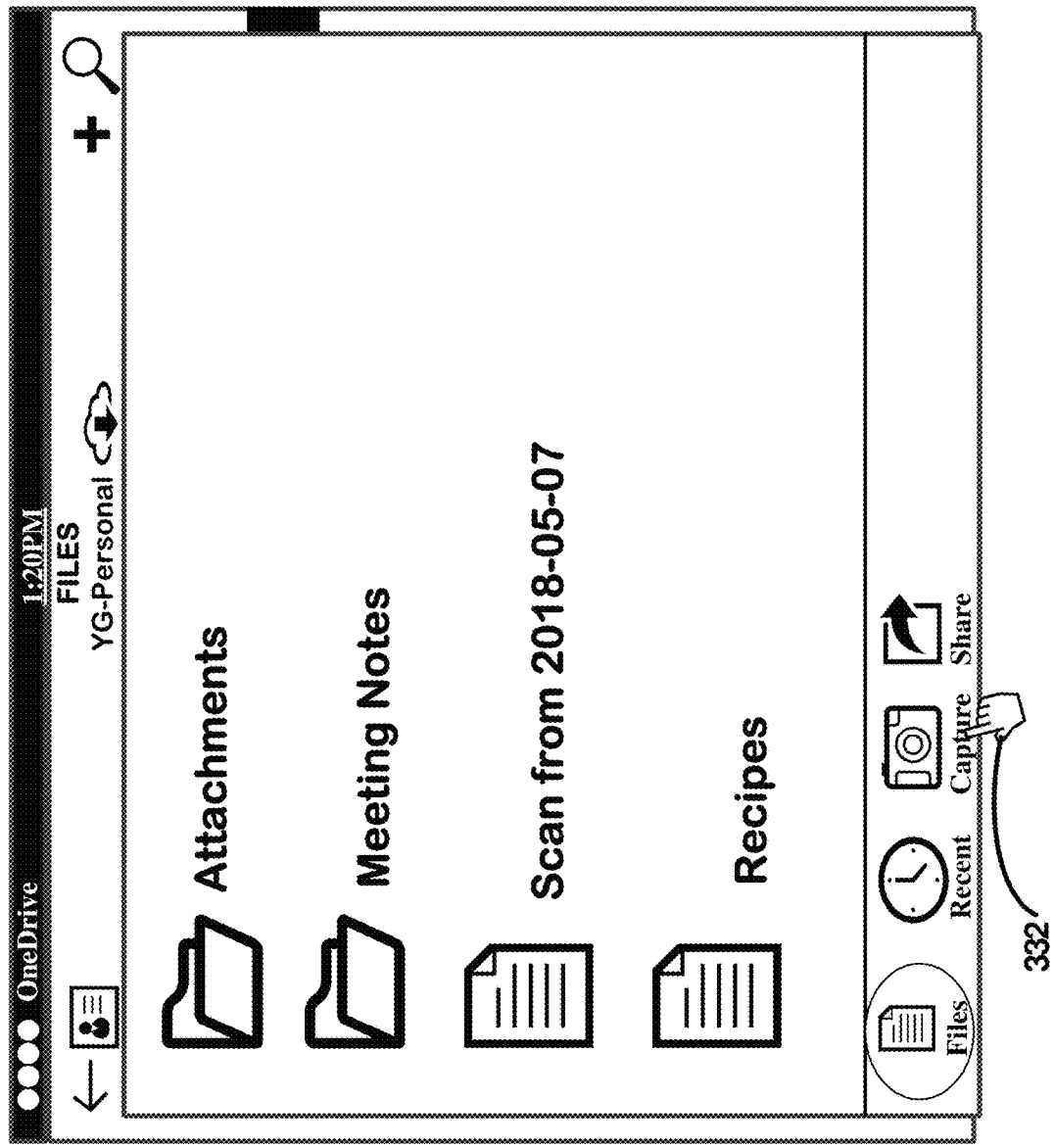

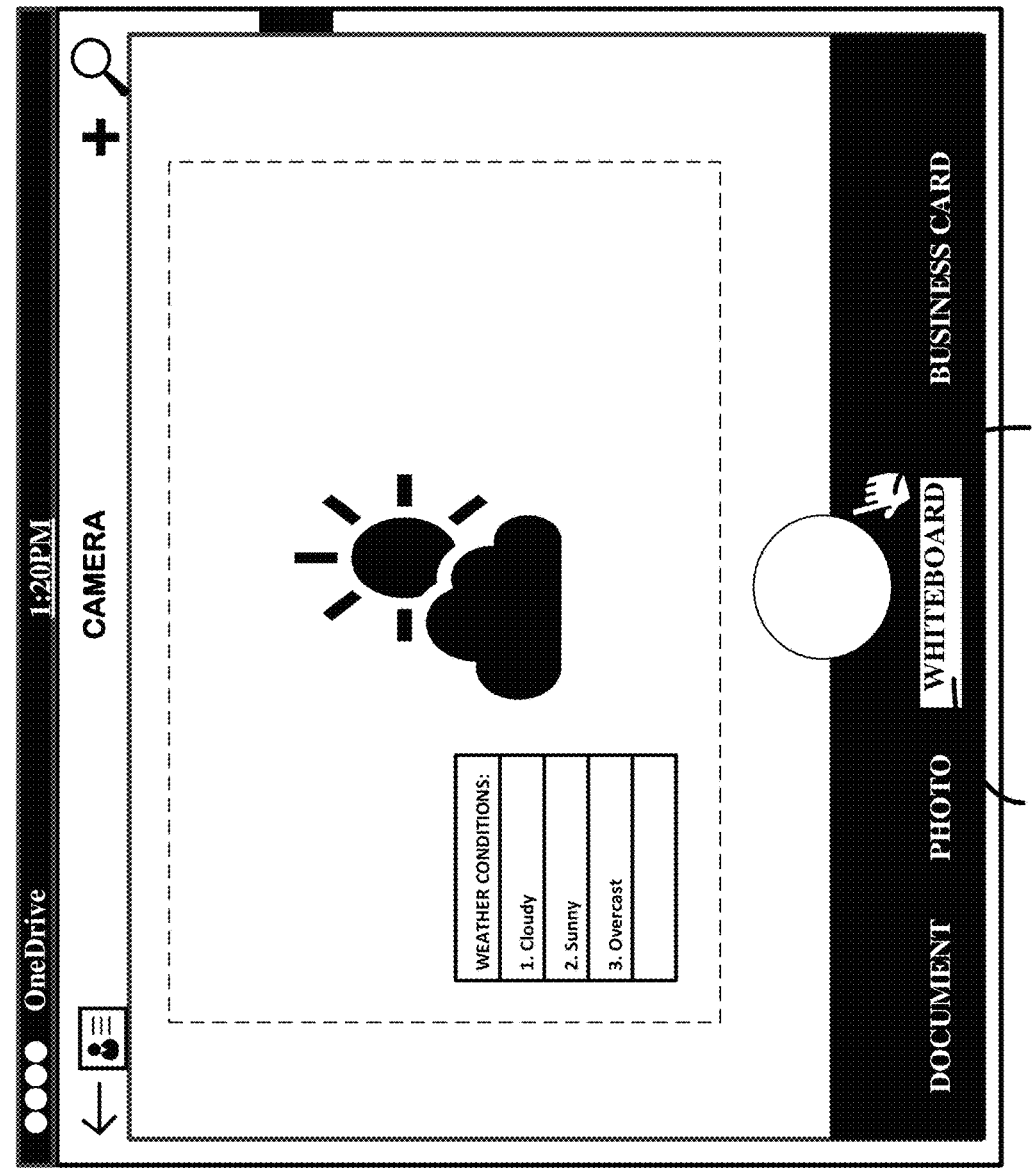

PROACTIVE SUGGESTION FOR SHARING OF MEETING CONTENT

CROSS-REFERENCE TO RELATED APPLICATIONS

This application claims priority to U.S. Provisional Patent Application No. 62/755,254, entitled "PROACTIVE SUGGESTION FOR SHARING OF MEETING CONTENT", filed on Nov. 2, 2018, which is incorporated by reference herein in its entirety.

BACKGROUND

Users constantly attend numerous meetings that may have different objectives. As a user's brain is typically preoccupied with focusing on the tasks at hand within a meeting, users typically forget to capture content that may be useful to assist with recall of the topics discussed in a meeting. If a user waits to long to try and piece together all the information discussed, that usually results in key information being left out and content forgotten. Empirical research shows that if a user does not associate content with a meeting within a certain time after the occurrence of the meeting, the likelihood of that content being associated with the meeting decreases dramatically. When the user attempts to manually recall what content was covered in a meeting, this leads to inefficient processing efficiency for not only the user but computing devices that are being used to locate specific content. For instance, the user may be executing numerous application/services, numerous pieces of content and associated actions to locate content the specific content that the user wishes to recall. This is not only inefficient for a user at run-time but also creates device latency and ties up computing resources that could be allocated to other tasks.

Moreover, user interfaces of applications/services are not traditionally configured to keep a user on task with associating content with a meeting. If the user forgets to take a picture of a whiteboard in a room where a meeting was being held, it is likely that whiteboard was erased, and that content was lost forever. Additionally, traditional user interfaces of applications/services often require users to tediously execute a plurality of actions to locate content, create a message for sharing the content with other users, identify the recipients of the shared content, etc. This is not only inefficient from a processing standpoint but also frustrating for a user, for example, when they forget to add content to a previous meeting instance.

SUMMARY

In view of the foregoing technical challenges, the present disclosure relates to processing operations configured for management of proactive suggestion(s) that may be utilized to manage the sharing of meeting content. The present disclosure further describes optimization of a user interface whereby a user interface experience is improved, over traditional user interface experiences, through new user interface features and actions that enable proactive presentation of suggestions for syncing content with a meeting as well as sharing synced content. As an example, various intelligent signals such as user's calendar, GPS location, camera roll content, capture content (including OCR, whiteboard detection, etc.) and capture time, are captured and analyzed to make smart suggestions to the user to share content with specific set of people (e.g., those involved in meeting). Signal data may be collected for an electronically scheduled meeting or an ad-hoc meeting that occurs impromptu. In any example, processing described herein enables contextual correlation between specific content and a scheduled meeting, whereby results of that contextual correlation can be used to execute programmed actions to improve efficiency for computing devices and users, for example, in instances where content is to be synced with a specific meeting as well as instances where content is to be shared with other users.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1 illustrates an exemplary process flow providing exemplary components usable for management of proactive suggestion(s) related to sharing of meeting content as described herein, with which aspects of the present disclosure may be practiced.

FIGS. 2A-2B illustrates exemplary methods related to management of proactive suggestions to foster sharing of meeting content, with which aspects of the present disclosure may be practiced.

FIGS. 3A-3G illustrate exemplary processing device views providing user interface examples for provision of proactive suggestion(s) that are usable to share meeting content, with which aspects of the present disclosure may be practiced.

DETAILED DESCRIPTION

Figure 3A:
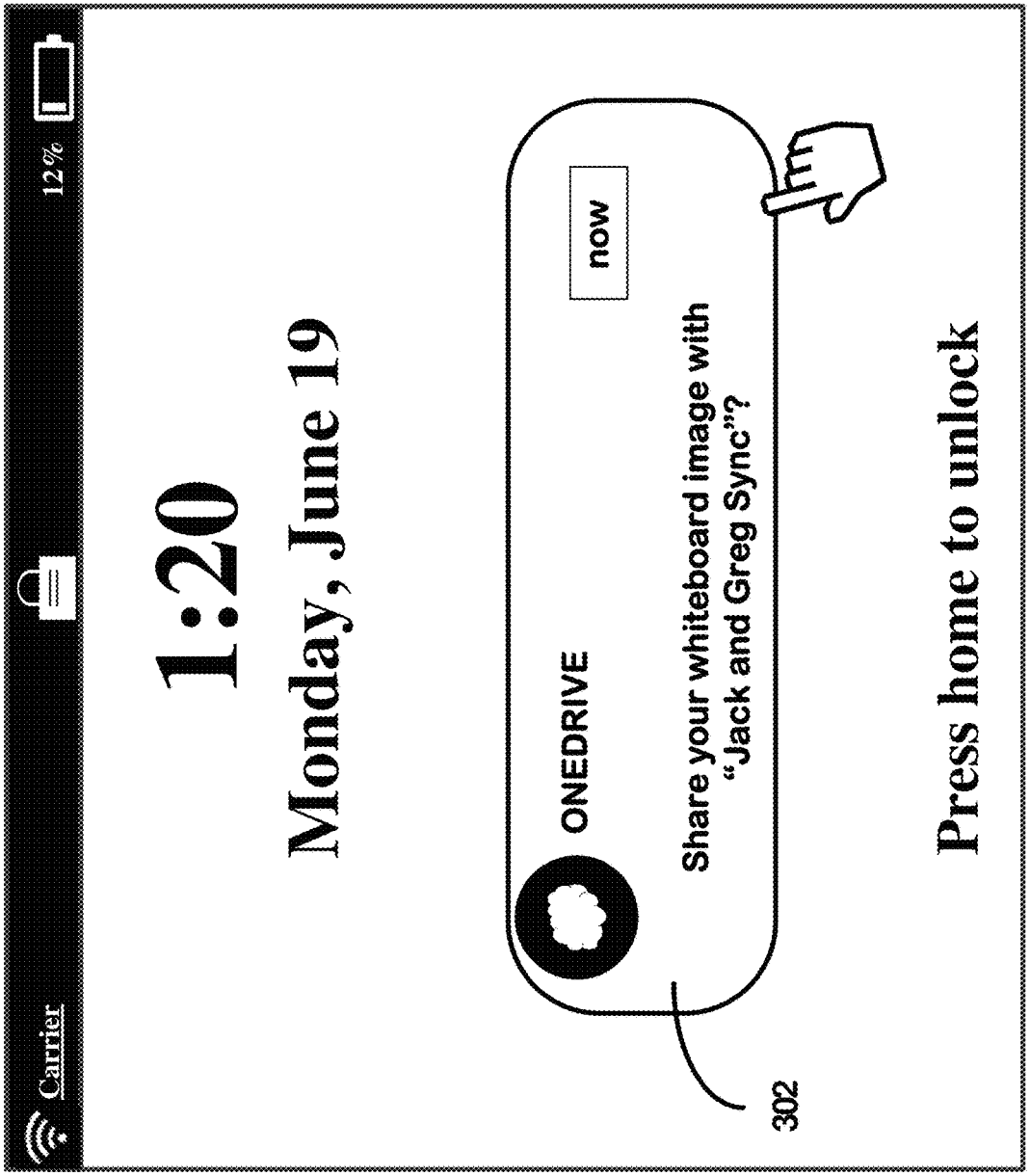

The present disclosure relates to processing operations configured for management of proactive suggestion(s) that may be utilized to manage the sharing of meeting content. The present disclosure further describes optimization of a user interface whereby a user interface experience is improved, over traditional user interface experiences, through new user interface features and actions that enable proactive presentation of suggestions for syncing content with a meeting as well as sharing synced content. As an example, various intelligent signals such as user's calendar, GPS location, camera roll content, capture content (including OCR, whiteboard detection, etc.) and capture time, are captured and analyzed to make smart suggestions to the user to share content with specific set of people (e.g., those involved in meeting). Signal data may be collected for an electronically scheduled meeting or an ad-hoc meeting that occurs impromptu. In any example, processing described herein enables contextual correlation between specific content and a scheduled meeting, whereby results of that contextual correlation can be used to execute programmed actions to improve efficiency for computing devices and users, for example, in instances where content is to be synced with a specific meeting as well as instances where content is to be shared with other users.

In some non-limiting examples, a user interface prompt is generated that is automatically pre-populated with data to assist the user with sharing of meeting content. For instance, user interface fields may be pre-populated and/or suggestions surfaced to assist users with associating content with an electronically scheduled meeting (or the occurrence of an ad-hoc meeting) as well as sharing content with other users. The interface prompt may be configured specifically for any type of application/service. In one example, an exemplary application/service is a productivity application/service for file hosting and synchronization (e.g., Microsoft® OneDrive®). For instance, a type of mode in which the user is operating an application/service (e.g., image capture mode, whiteboard mode, handwritten input mode, notes mode, content scanning mode, business card mode, audio/video capture mode, data backup mode) may be a trigger for associating content with a meeting on behalf of a user. In another example, an exemplary application/service is productivity application/service such as a camera application/service or a calendaring application/service. However, examples described herein are configured to work with any type of content and any type of application/service. Signal data may be collected and analyzed to generate insights for correlating image content with an electronically scheduled meeting, where a user interface of the productivity application/service may be adapted to enable quick association of content with meetings as well as identification of other users (e.g., meeting invitees or attendees) for sharing of content. In one instance, a user interface prompt is generated with a suggestion to associate specific content with a specific meeting. In another instance, a user interface prompt may be generated that provides suggestions for sharing content with other users that are associated with a meeting.

In other non-limiting examples, a sharing notification is automatically generated on behalf of a user and automatically presented to the user. An example sharing notification may comprise a reminder to associate content with the electronically scheduled meeting. For instance, a sharing notification may be generated and surfaced within a predetermined time window for occurrence of an electronically scheduled meeting or in instances where an electronic meeting occurs ad-hoc. As an example, a predetermined time window may be a time period being: before a meeting; during a meeting; after a meeting; or a time period that overlaps any combination thereof. In some alternative instances, sharing notifications may be generated and surfaced at a predetermined time window after the occurrence of a meeting (e.g., one day, two days), for example, in instances where signal data is collected that indicates that the user may have forgotten to associate content with a meeting or share content with other users. Similar to other examples described herein, a type of mode in which a user is working with content may be a trigger for initiating processing to correlate content with a meeting and subsequently issue a reminder notification to add content to storage associated with a meeting and/or share content with other users.

In further examples, results of correlation processing that associates content with a meeting, may be utilized to assist users with other tasks or operations. Examples of such tasks or operations comprise but are not limited to: automatically providing suggestions for adding content to a meeting event; enabling suggestions for search of topics/keywords; converting content to different formats (including adapting content for working in different applications/services); fostering collaboration between users for content; data organization suggestions (e.g., re-arranging data in files and folders, grouping associated content); and suggestions identified during data backup (e.g., suggestions for pairing content with a specific meeting or sharing content with other users), among other examples. In some instances, a user account may be associated with more than one meeting, where signal data may be collected and analyzed to either suggest a correlation between content and a specific meeting or provide a customized user interface prompt that enables a user to select a specific meeting to associate content with.

Exemplary technical advantages provided by processing described in the present disclosure comprise but are not limited to: proactive notification generation and presentation of suggestions for associating content with a specific meeting (or group of meetings); proactive notification and generation of sharing notifications providing suggestions for sharing content with other users associated with a meeting; generation and application of predictive confidence levels for correlating content with an electronically scheduled meeting; automated pre-population of data fields on behalf of a user in a contextually-relevant manner; improved processing efficiency (e.g., reduction in processing cycles, saving resources/bandwidth) for computing devices during capture of content and sharing of content; adapting and improving front-end user interfaces that are utilized for proactive suggestion generation and content management; extensibility to tailor processing operations described herein across a plurality of different applications/services; reduction in latency during operations of applications/services; and improving usability of applications/services, among other technical advantages.

FIG. 1 illustrates an exemplary process flow 100 providing exemplary components usable for management of proactive suggestion(s) related to sharing of meeting content as described herein, with which aspects of the present disclosure may be practiced. As an example, components of process flow 100 may be executed by an exemplary computing system (or computing systems) as described in the description of FIG. 4. Exemplary components, described in process flow 100, may be hardware and/or software components, which are programmed to execute processing operations described herein. In one example, components of process flow 100 may each be one or more computing devices associated with execution of a specific service. Exemplary services may be managed by an application platform that also provides, to a component, access to and knowledge of other components that are associated with applications/services. In one instance, processing operations described in process flow 100 may be implemented by one or more components connected over a distributed network. Operations performed in process flow 100 may correspond to operations executed by a system and/or service that execute computer programs, application programming interfaces (APIs), neural networks or machine-learning processing, language understanding processing, search and filtering processing, and generation of content for presentation through a user interface of an application/service, among other examples. In the illustration of process flow 100, there are process flow steps that are aimed at emphasizing non-limiting examples of interaction between components shown in FIG. 1. Process flow between components may be altered without departing from the spirit of the present disclosure.

Process flow 100 comprises user computing device(s) 102 (e.g., client computing device). An example of a user computing device 102 is a computing system (or computing systems) as described in the description of FIG. 4. A user may interact with an exemplary application/service through the user computing device(s) 102. For instance, the user may connect to an application/service through any number of different device modalities. In some examples, a user may connect to an application/service (e.g., a productivity application/service that is utilized to access, create or modify content) through different user computing devices 102, where non-limiting examples of such are: a smart phone, a laptop, a tablet, a desktop computer, etc. In other instances, a user may carry on a multi-modal communication with an application/service via multiple user computing devices.

A user may be accessing, through interfacing between a computing device 102 and a productivity application/service component 106, one or more application/services that are used to execute any type of task including: accessing content; creating content; modifying content; managing content (including metadata) for a meeting; and attending a meeting (e.g., electronically scheduled or ad-hoc), among other examples. An application/service that the user is accessing is configured to provide a user interface or graphical user interface (GUI) that enables access to and creation/modification of content. An example user interface may be adapted to provide functionality described herein where user interface features and application command control is achieved to foster improved management of sharing notifications and suggestions through new user interface features that are not present in traditional user interface systems. New user interface menus may be presented to a user that include another proactive suggestions and notifications for management of sharing of content relative to an electronically scheduled meeting or an ad-hoc meeting. Processing device views that illustrate non-limiting user interface examples of the present disclosure are provided in FIGS. 3A-3F.

As referenced above, exemplary applications/services may interface with other components of process flow 100 to enhance processing efficiency and functionality as described herein. The productivity application/service component(s) 106 is configured to interface with other components of process flow 100 including computing device(s) 102 and the meeting sharing component(s) 104. Applications/services may be any type of programmed software. An exemplary application/service is a productivity application/service that is configured for execution to enable users to complete tasks on a computing device, where exemplary productivity services may be configured for access to and creation of content including electronic documents. Examples of productivity services comprise but are not limited to: word processing applications/services, spreadsheet applications/services, notes/notetaking applications/services, authoring applications/services, digital presentation applications/services, search engine applications/services, email applications/services, messaging applications/services, web browsing applications/services, collaborative team applications/services, digital assistant applications/services, webpage building applications/services, directory applications/services, mapping applications/services, calendaring applications/services, electronic payment applications/services, file storage and synchronization applications/services, digital data storage or distributed data storage applications/services, web conferencing applications/services, call communication applications/services, camera applications/services, audio/video applications/services, language understanding applications/services, bot framework applications/services, networking applications/service, and social networking applications/services, among other examples. In some examples, an exemplary productivity application/service may be a component of an application platform providing a suite of productivity applications/services. An application platform suite is configured to providing access to a plurality of applications/services, thereby enabling cross-application/service usage to enhance functionality of a specific application/service at run-time. As productivity features may span a wide variety of functionality, contextual relevance evaluation is configured to identify specific productivity features that are most relevant to a context in which a user is accessing an electronic document. Moreover, specific application/services as well as application platform suites may be configured to interface with other non-proprietary application/services (e.g., third-party applications/services) to extend functionality including productivity feature suggestion and implementation.

The user computing device(s) 102 may be used to access content (or capture content) through one or applications/services, provided by the application/service component(s) 106. In one example, content may be stored locally on a data storage associated with the user computing device(s) 102. In some other examples, the application/service component(s) 106 is configured to provide distributed storage that is specific to a user account (or group of users), where content may be stored on the distributed storage(s) and accessed by users. As an example, an application/service may be an application/service that manages file storage and synchronization providing functionality that enables users to: add file content, synchronize file content, backup file content and capture new file content and share file content. In another instance, the user computing device(s) 102 may be utilized to capture content that is locally stored on a storage associated with the user computing device(s) 102 and subsequently synchronized with a distributed application/service. In some examples, a user may be attempting to capture content (e.g., image content) through a specific mode of an application/service, which may provide details regarding the capture of content. Types of modes of content capture may comprise but is not limited to: an image capture mode; a whiteboard mode; a handwritten input mode; a notes mode; a business card mode; a content scanning mode; an audio or video capture mode; and a data backup mode, among other examples. In any example, the meeting sharing component(s) 104 may be configured to interface with such an application/service to enable adaptation of a user interface (e.g., tailored user interface prompts) that may foster correlation of content with a specific meeting, provide pre-populated prompts for saving content, suggestions for managing content and/or provide sharing notifications and suggestions.

As referenced in the foregoing, the application/service component(s) 106 is configured to interface with the meeting sharing component(s) 104. Interfacing between the application/service component(s) 106 and the meeting sharing component(s) 104 enables collection and analysis of signal data by the meeting sharing component(s) 104. As an example, a user may be capturing content through an application/service, where signal data is collected and analyzed to enable tasks and actions comprising but not limited to: automatically providing suggestions for adding content to a meeting event; enabling suggestions for search of topics/keywords; converting content to different formats (including adapting content for working in different applications/services); and fostering collaboration between users for content, among other examples. For instance, the type of mode in which the user is capturing content may be a trigger for associating content with a meeting on behalf of a user. If the user is capturing a photo in a whiteboard mode, at a time that overlaps a predetermined time window for a meeting, this may be a strong indication that the content captured may relate to the meeting.

The meeting sharing component(s) 104 is configured to execute processing operations described herein to manage a correlation between content and a scheduled or occurring meeting. The meeting sharing component(s) 104 is further configured to subsequently manage generation of user interface prompts providing suggestions and notifications as described herein. Non-limiting examples of processing operations executed by the meeting sharing component(s) 104 comprise processing operations described in method 200 (FIG. 2A) and method 250 (FIG. 250).

In one example, the meeting sharing component(s) 104 is configured to execute an application programming interface (API) that enables the collection and analysis of signal data that is used for correlation of content with a specific meeting. Examples of signal data that may be collected, parsed and analyzed comprise: device-specific signal data; user-specific signal data (e.g., user account data and groups/teams); signal data specific to applications/services; and any combination thereof. Non-limiting examples of specific signal data that may be collected from the above identified sources include but are not limited to: calendared events associated with a user account; meeting details associated with an electronically scheduled meeting invite; invitee and/or attendee status of an electronically scheduled meeting invite; geo-locational data associated with user computing devices; metadata associated with specific content; results of recognition analysis processing (e.g., optical character recognition (OCR) processing of image content, language understanding analysis, text and entity evaluations); state of application/service execution (e.g., including signal data indicating applications/services that a user is accessing); signal data related to folder and file creation (e.g., creation of a folder for meeting content); and evaluation of tasks and reminders set by user(s), among other examples.

The meeting sharing component(s) 104 may be configured to detect an electronically scheduled meeting invite, for example, that is scheduled in a calendaring application/service or email application/service. The electronically scheduled meeting invite may be for an electronic meeting or a meeting that occurs in-person or over the phone. In some examples, applications/services may detect an occurrence of an electronically scheduled meeting, for example, based on analysis of signal data associated with scheduling of a meeting and/or signal data indicating that a user is actively attending a meeting. Alternatively, the meeting sharing component(s) 104 may be configured to detect an ad-hoc occurrence of a meeting, for example, through a call communication application/service (e.g., Skype®), social networking application/service, email application/service, calendaring application/service, communication platform, etc.

In any example, the meeting sharing component(s) 104 may be configured to proactively parse meeting data to generate insights for correlating content with a meeting, for example, before, during or after an occurrence of a meeting. In other examples, the meeting sharing component(s) 104 may utilize the receipt of signal data, within a given time window (e.g., predetermined time period/window) of an occurrence of a meeting, as a trigger for processing that correlates content with a meeting. A predetermined time window may be set by developers and be adapted. For instance, a predetermined time window may correspond with the time period set for the occurrence of the meeting or be within a given number of minutes, days, etc., before (or after) the occurrence of a meeting. In some cases, time windows may correspond to reminders (e.g., pre-meeting reminders or follow-up meeting reminders), where suggestions and/or notifications may be generated to remind users to associate content with a specific meeting Signal data may be collected and analyzed pertaining to electronic details associated with an electronically scheduled meeting invite (or an ad-hoc meeting) to evaluate details that may be utilized to match content to a specific meeting. For instance, a meeting title, subject, keywords, body text, etc., may be analyzed for identifying meeting details that can be matched to content to determine a correlation between the content and the meeting. Other types of data that may be analyzed from meeting details include but are not limited to: attachments; meeting invitees; attendee statuses; location; means of connecting to the meeting, among other examples.

Moreover, the meeting sharing component(s) 104 is further configured to collect signal data for analysis of content that may be associated with a meeting. As indicated in the foregoing description, content may be accessed or captured through the user computer device(s) 102 through access to an executing application/service. Any type of content may be correlated with a meeting, where non-limiting examples of content that may be analyzed comprise is not limited to: electronic documents/files; image content; text content; audio content; handwritten content; video content; rich interactive data objects; and messaging content (e.g., instant message/chat messages, emails, social networking posts), among other examples. Analysis of signal data associated with content may comprise evaluating: geo-locational data associated with user computing devices; metadata associated with specific content (including time/stamp data); results of recognition analysis processing (e.g., optical character recognition (OCR) processing of image content, language understanding analysis, text and entity evaluations); results of user actions such as access to content (e.g., when a user accessed content), capture of content, etc.; state of application/service execution (e.g., including signal data indicating applications/services that a user is accessing) including a type of mode in which content is accessed or captured; and signal data related to folder and file creation (e.g., creation of a folder for meeting content), among other examples. For instance, access to content or capture of content at a specific time that overlaps the occurrence of a meeting (or a predetermined time window associate with a meeting) may provide direct correlation suggesting that the access or capture of content may be relevant to a specific meeting.

In some examples, the meeting sharing component(s) 104 is configured to analyze signal data associated with content. In other instances, the meeting sharing component(s) 104 interfaces with one or more other components, via a distributed network, to receive insights resulting from analysis of content. As an example, the meeting sharing component(s) 104 may be a component of or interface with applications/services of an application platform suite (e.g., Office365®), which enables extensibility to a plurality of different application/services providing various functionality.

The meeting sharing component(s) 104 is further configured to execute processing operations for predictive or deterministic insight generation for correlating content with a meeting. In one example, analysis of data for the generation of insights occurs through implementation of data modeling. For instance, machine learning modeling may be applied to correlate collected signal data and generate confidence scoring for matching content with a specific meeting. Other non-limiting examples used for correlation of signal data include comprise but are not limited to: APIs, statistical classifiers, neural networks, and artificial intelligence, among other examples. Confidence scoring, or other methods of ranking as known to one skilled in the field of art, may be utilized for generation of user interface prompts (including pre-populated data) and generation of notifications (e.g., sharing notifications). For instance, threshold scoring may be utilized to generate a confidence determination that content is associated with a specific meeting. In instances where a confidence threshold is not reached, the meeting sharing component(s) 104 may be configured to generate user interface features that request disambiguation from a user. For example, a user may have two concurrently scheduled meetings, where content may be associated with either meeting. In such examples, one or more user interface prompts may be generated through the meeting sharing component(s) 104 and presented through a user interface of an application/service to enable users to select a specific meeting to associate content with. In some instances, the meeting sharing component(s) 104 may be configured to pre-populate suggestions for associating content with both meetings so that the user can easily and efficiently chose a suggestion and disregard one that is not relevant.

In some examples, the meeting sharing component(s) 104 is configured to collect telemetry data to assist with the predictive or deterministic insight generation. Non-limiting examples of telemetry data collected for analysis may comprise but is not limited to: data pertaining to scans captured in a time window that corresponds with a meeting; data pertaining to content capture (e.g., images, handwritten input, audio input, video input) in a time window that corresponds with a meeting; metrics relate to user interaction with notifications, suggestions, etc.; data related to transmission of notifications (e.g., notifications sent or received); data pertaining to collaborative accessing and sharing; data associated with attendee/invitee status of a meeting; data related to timing in which a user took action with respect to a suggestions and/or notification; data related to activation/disabling of notifications; and data related to a correlation of keywords in content with instances that content was matched to a specific meeting, among other examples.

As referenced in the foregoing, the meeting sharing component(s) 104 is configured to generate suggestions and notifications based on results of analysis of the aggregated signal data. Types of suggestions and/or notifications that may be generated comprise but are not limited to: suggestions for saving content (e.g., including a meeting name in the title of a file for the content); suggestions for associating content with a specific file or folder; suggestions for associating content with a specific meeting (or to disambiguate from a number of meetings); suggestions for sharing content with other users (e.g., other invitees or attendees of a meeting); notifications of an occurrence of a meeting including a reminder to associate content with the meeting; and suggestion notifications to associate specific content with a specific meeting, among other examples. Processing device views that illustrate non-limiting user interface examples of suggestions and notifications are provided in FIGS. 3A-3F. Suggestions and/or notifications may be presented through a user interface of an application/service or through a user interface of an operating system executing on a client computing device 102.

In some non-limiting examples, a user interface prompt is generated that is automatically pre-populated with data to assist the user with sharing of meeting content. For instance, user interface fields may be pre-populated and/or suggestions surfaced to assist users with associating content with an electronically scheduled meeting (or the occurrence of an ad-hoc meeting) as well as sharing content with other users. As an example, the meeting sharing component(s) 104 may be configured to utilize an attendee status (e.g., pending, accepted, declined, tentative) to determine how to tailor a user interface prompt to suggest users to share content with. For instance, a user interface prompt may be pre-populated with contact data for one or more invitees that have accepted an electronic meeting invite for the electronically scheduled meeting. In other examples, data such as a meeting name, title, keyword, etc., may be utilized in a naming convention for a file such as content that a user is capturing. In other examples, data extracted from meeting details may be utilized to pre-populate data fields of a sharing notification, where a message name or subject may comprise data identifying a specific meeting. Naming conventions and formats for pre-populated content may vary according to developer preferences and may include any type of data resulting from signal data analysis.

In other non-limiting examples, a sharing notification is automatically generated on behalf of a user and automatically presented to the user. An example sharing notification may comprise a reminder to associate content with the electronically scheduled meeting. For instance, a sharing notification may be generated and surfaced within a predetermined time window for occurrence of an electronically scheduled meeting or in instances where an electronic meeting occurs ad-hoc. As an example, a predetermined time window may be a time period being: before a meeting; during a meeting; after a meeting; or a time period that overlaps any combination thereof. In some alternative instances, sharing notifications may be generated and surfaced at a predetermined time window after the occurrence of a meeting (e.g., one day, two days), for example, in instances where signal data is collected that indicates that the user may have forgotten to associate content with a meeting or share content with other users. Similar to other examples described herein, a type of mode in which a user is working with content may be a trigger for initiating processing to correlate content with a meeting and subsequently issue a reminder notification to add content to storage associated with a meeting and/or share content with other users.

In further examples, results of correlation processing that associates content with a meeting, may be utilized to assist users with other tasks or operations. Examples of such tasks or operations comprise but are not limited to: automatically providing suggestions for adding content to a meeting event; enabling suggestions for search of topics/keywords; converting content to different formats (including adapting content for working in different applications/services); fostering collaboration between users for content; data organization suggestions (e.g., re-arranging data in files and folders, grouping associated content); and suggestions identified during data backup (e.g., suggestions for pairing content with a specific meeting or sharing content with other users), among other examples.

FIGS. 2A-2B illustrates exemplary methods related to management of proactive suggestions to foster sharing of meeting content, with which aspects of the present disclosure may be practiced. Processing operations described in method 200 (FIG. 2A) and method 250 (FIG. 2B) may be executed by components described in process flow 100 (FIG. 1), where the detailed description in process flow 100 supports and supplements the recited processing operations in respective methods. Interfacing and communication between exemplary components, such as those described in process flow 100, are known to one skilled in the field of art. For example, data requests and responses may be transmitted between applications/services to enable specific applications/services to process data retrieved from other applications/services. Formatting for such communication may vary according to programmed protocols implemented by developers without departing from the spirit of this disclosure.

Figure 4:
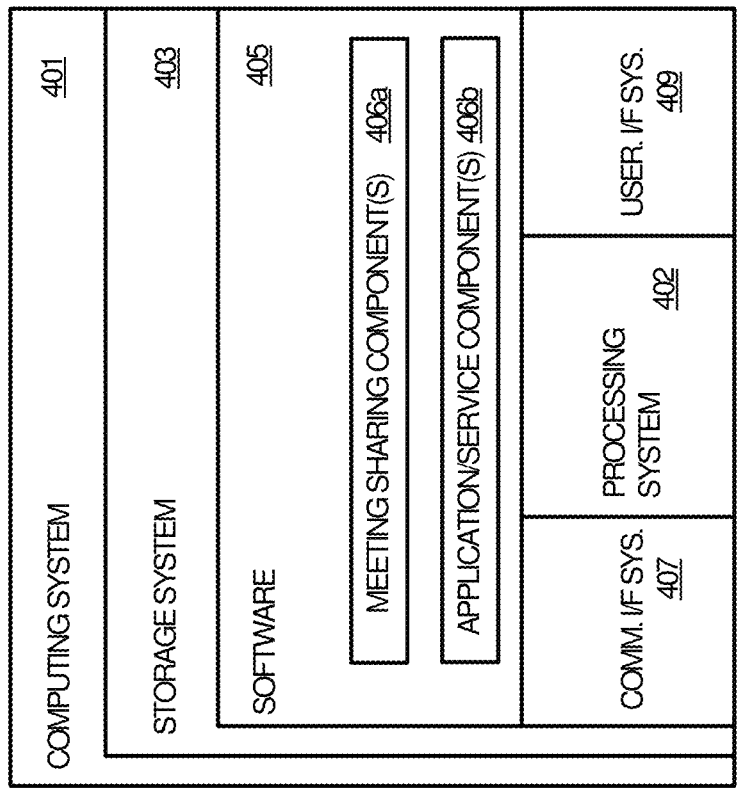
FIG. 4 illustrates a computing system suitable for implementing processing operations described herein related to management of proactive suggestion(s) for sharing of meeting content, with which aspects of the present disclosure may be practiced.

As an example, method 200 and method 250 may be executed across an exemplary computing system (or computing systems) as described in the description of FIG. 4. Exemplary components, described in method 200 and method 250, may be hardware and/or software components, which are programmed to execute processing operations described herein. Operations performed in method 200 and method 250 may correspond to operations executed by a system and/or service that execute computer programs, software agents, intelligent bots, application programming interfaces (APIs), neural networks and/or machine-learning processing, among other examples. In some examples, processing operations described in method 200 and method 250 may be executed by one or more applications/services associated with a web service that has access to a plurality of application/services, devices, knowledge resources, etc. In one instance, processing operations described in method 200 and method 250 may be implemented by one or more components connected over a distributed network.

Method 200 begins at processing operation 202, where signal data associated with a meeting is analyzed. As described in the foregoing description, signal data may be analyzed for an electronically scheduled meeting as well as in instances where a meeting occurs ad-hoc. Processing operation 202 may be executed by a meeting sharing component 104 as described in FIG. 1. Examples of analysis of signal data by the meeting sharing component 104 have been provided in the foregoing description. For instance, non-limiting examples of signal data evaluated in processing operation 202 comprises but are not limited to: detecting a scheduled meeting time for the electronically scheduled meeting; detecting an attendance status of invitees for the electronically scheduled meeting; and parsing meeting details associated with the electronically scheduled meeting.

In some examples of method 200, flow may proceed to processing operation 204, where access to content may be detected. For example, a user may access content (e.g., select, open, create) at or approximate to the occurrence of a meeting (e.g., electronically scheduled meeting) or a predetermined time window associated with a meeting. This may be a trigger to initiate correlation (processing operation 206) of content with a specific meeting.

In other examples of method 200, access to content is not required to initiate correlation (processing operation 206) of content with a specific meeting. Processing operation 206 may be executed by a meeting sharing component 104 as described in FIG. 1. Examples related to correlation of content with a specific meeting have been provided in the foregoing description. Correlation (processing operation 206) of the content with a specific meeting may comprise operations such as: evaluating content and data associated with the content (e.g., metadata, telemetry data; signal data associated with capture of or access to the content); generating specific insights based on a matching of data from content analysis with data from analysis of the signal data associated with the electronically scheduled meeting; and generating confidence determinations for determining whether content is related to a specific meeting. As an example, probabilistic confidence level evaluations may be generated that correlate content with a specific meeting. In one example, correlation processing (processing operation 206) comprises matching an access time to the content with a predetermined time window associated with a scheduled meeting time for an electronically scheduled meeting. This may help identify that content was accessed or captured around the time an electronically scheduled meeting occurred.

Flow of method 200 may proceed to processing operation 208, where a sharing notification is generated. The sharing notification may be generated (processing operation 208) based on the correlation of the content with a specific meeting. In one example, the sharing notification may comprise a reminder to associate the content with the electronically scheduled meeting. In another example, the sharing notification may specifically identify content and/or a specific meeting (e.g., an electronically scheduled meeting) to remind a user to associate content with that meeting. In yet another example, the sharing notification may comprise a suggestion to share content with other users associated with a meeting. For instance, a sharing notification may be pre-populated with contact data for one or more invitees (or attendees of a meeting). Confidence level evaluations, generated in processing operation 206, may be utilized to tailor user interface prompts for suggestions and/or notifications for applicable use cases (e.g., what data is included in a pre-populated suggestion).

At processing operation 210, the sharing notification is present, through a user interface, executing on a computing device (e.g., client computing device 102 described in FIG. 1). As an example, a user interface may be an application/service such as a productivity application/service that is executing on a computing device. In another example, a sharing notification is presented through a user interface associated with an operating system that is executing on a computing device.

Further examples of method 200 comprise user processing results from user interactions with a shared notification. In processing operation 212, a selection is received of a sharing notification. For instance, a user may tap on a displayed sharing notification or provide an utterance requesting that further information be provided for a displayed sharing notification. In at least one example, receipt of a selection of a sharing notification may trigger display of a new user interface prompt. At processing operation 214, a new user interface prompt is displayed that comprises pre-populated data for content sharing with one or more meeting invitees (or attendees) of a specific meeting. As described in the foregoing, pre-populated data may be generated based on correlation processing (processing operation 206) that correlates content with a specific meeting.

At decision operation 216, it is determined whether an action to share content is received through the user interface. For instance, a user may provide input to send the sharing notification, with or without modification, to one or more other users through the user interface. In one example, a sending of a sharing notification may comprise transmitting the sharing notification to one or more of the pre-populated invitees. In examples where no sharing action is received, decision operation 216 branches NO and processing of method 200 remains idle until subsequent processing is received. In examples where a sharing action is received, flow of decision operation 216 branches YES and processing of method 200 proceeds to processing operation 218. At processing operation 218, content is shared with one or more of the meeting invitees. In some examples, processing operation 218 may further comprise providing a notification to a user than content has been shared.

Turning to method 250, further examples of processing operations related generation of proactive suggestions and notifications are provided.

Method 250 begins at processing operation 252, where access to content is detected through a user computing device. As an example, access to content may be detected at a time that overlaps with a predetermined time window for a meeting (e.g., an electronically scheduled meeting). Among other instances, a user may be creating documents in preparation for a meeting or a meeting may be occurring where a user captures a photo of a whiteboard during the meeting. Detection (processing operation 252) of access to content may comprise any detecting any file usage including but not limited to: content open by a user; content selected by a user; content viewed by a user' content captured by a user; and utterances spoken by a user referencing specific content (e.g., notes for reminders/tasks), among other examples. For example, a user may be capturing image content, through a whiteboard mode of a productivity application/service or a camera application/service, during the occurrence of a meeting. Detection (processing operation 252) of access to content may further comprise collecting signal data associated with access to the content.

Flow may proceed to processing operation 254, where the accessed content is analyzed. Processing operations related to analysis of content, including the content itself as well as signal data and metadata associated with the content, has been described in the foregoing description (e.g., description of meeting sharing component 104 of FIG. 1).

Method 250 may proceed to processing operation 256, where signal data associated with a meeting may be collected (processing operation 256) and analyzed (processing operation 258). The content may be correlated (processing operation 260) with data from scheduled meeting. Processing operations for collecting signal data, analyzing signal data and correlating content with one or more meetings have been described in the foregoing description (e.g., description of meeting sharing component 104 of FIG. 1).

Processing of method 250 may proceed to operation 262, where one or more user interface prompts may be generated for management of meeting content. A type of user interface prompt that is generated may dependent on the context associated with user access to content. For instance, a correlation may be made that a user is capturing image content through an application/service at a time in which a meeting is occurring (or within a predetermined time window associated with a meeting). This may lead to generation of a user interface save prompt for the user to save the content with an association to a specific meeting. In such instances, a user interface save prompt may be surfaced (processing operation 264) for a user to save content and develop an association with meeting (e.g., an electronically scheduled meeting). In some examples, the user interface save prompt may be pre-populated with data to associate content with a storage folder for content of a meeting. For instance, a storage folder may be created (or accessed) through a distributed application/service, where the storage folder may have a naming convention associated with signal data extracted from the meeting. In other instances, a naming convention for a file or folder may dependent on the signal data extracted from the meeting and signal data associated with the content. As a non-limiting example, whiteboard image content that is correlated with a specific meeting may have a naming convention similar to ("Meeting Name"-"Whiteboard"), indicating the meeting name and the type of content.

In further examples of method 250, a user interface prompt for sharing meeting content may be presented (processing operation 266) through a user interface of an application/service. The user interface prompt may be configured to share the image content with one or more invitees of the electronically scheduled meeting, wherein the user interface prompt is pre-populated with contact data for the one or more invitees based on the detected attendee status of invitees to the electronically scheduled meeting. For instance, the user interface prompt may be pre-populated with contact data for one or more invitees that have accepted an electronic meeting invite for the electronically scheduled meeting. In some examples, the user interface prompt is further pre-populated with a meeting name for the electronically scheduled based on a result of the parsing of the meeting details.

At decision operation 268, it is determined whether an action to share content is received through the user interface of an application/service. For instance, a user may provide input to send the sharing notification, with or without modification, to one or more other users through the user interface. In one example, a sending of a sharing notification may comprise transmitting the sharing notification to one or more of the pre-populated invitees. In examples where no sharing action is received, decision operation 268 branches NO and processing of method 250 remains idle until subsequent processing is received. In examples where a sharing action is received, flow of decision operation 268 branches YES and processing of method 250 proceeds to processing operation 270. At processing operation 270, content is shared with one or more of the meeting invitees. In some examples, processing operation 270 may further comprise providing a notification to a user than content has been shared.

FIGS. 3A-3G illustrate exemplary processing device views providing user interface examples for provision of proactive suggestion(s) that are usable to share meeting content, with which aspects of the present disclosure may be practiced. Processing operations described in process flow 100 (FIG. 1), method 200 (FIG. 2A) and method 250 (FIG. 2B) support and supplement back-end processing used for generation of exemplary processing device views shown in FIGS. 3A-3G.

FIG. 3A presents processing device view 300, illustrating an example of a proactive suggestion for sharing of content in association with a scheduled meeting. As an example, a scheduled meeting may be associated with a user account that is used to access a meeting. For instance, a user account may be an invitee or attendee for an electronically scheduled meeting. The user account may sign-in to a computing device (e.g., operating system) or an application/service (e.g., via a network connection), where access initiated by the user account may be a trigger for executing back-end processing operations to evaluate a state of an electronically scheduled meeting that is associated with the user account. In one example, the user account may be identified as an attendee to a web conferencing session (e.g., Skype® meeting) that is soon to be occurring, presently active or has recently ended. In any example, processing operations described herein may be utilized to proactively generate and present notification 302 on behalf of a user to aid with processing efficiency and operation of a computing device and/or executing applications/services. Notification 302 is a user interface which provides a suggestion to share content with a specific electronically scheduled meeting (e.g., "Jack and Greg Sync" that the user account is associated with. For example, a user may be accessing image content or capturing a photo of a whiteboard (e.g., through a camera application/service, distributed storage application/service or other productivity application/service) during an occurrence of an electronically scheduled meeting or within a predetermined time window of a time of occurrence of the scheduled meeting. Analysis may be executed that correlates the access to the image content with meeting details associated with the meeting. A notification may be proactively surfaced, via a computing device, to encourage sharing and/or upload of content that may be associated with the meeting. In other examples, a proactive notification 302 may be more of a generalized suggestion to remind attendees to share content for a meeting. The notification 302 may be a standalone reminder for the user to take action. Alternatively, a user interface may be adapted to enable linking of task execution to the notification 302, where correlated content may be suggested for sharing with other users (e.g., meeting invitees, attendees) through additional user interface prompts.

Figure 3B:
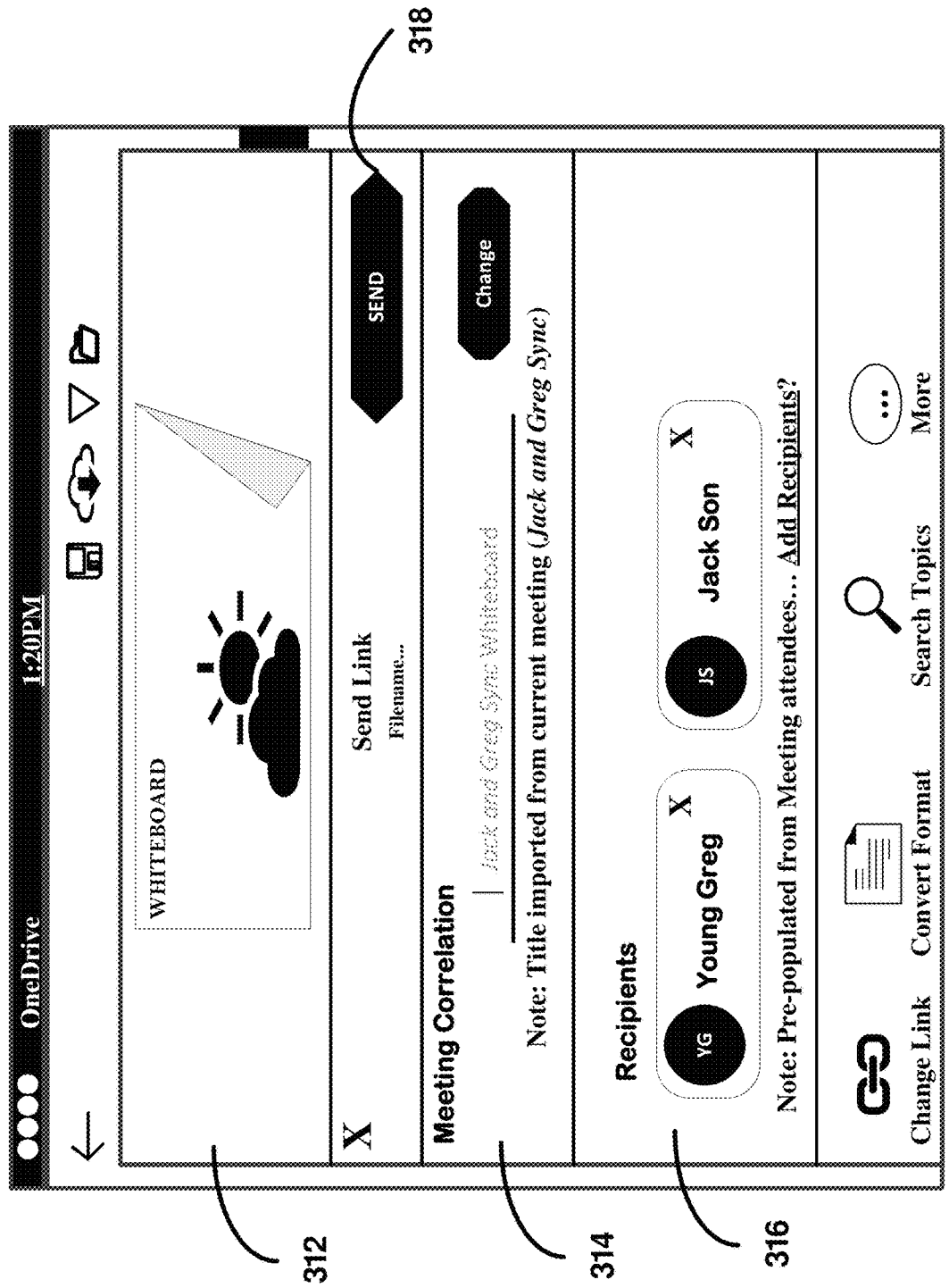

FIG. 3B presents processing device view 310, illustrating an example of a user interface notification tailored for sharing of content for a meeting. In one non-limiting example, the notification shown in processing device view 310 may be a continued example of the proactive notification 302 (FIG. 3A), where a selection of proactive notification 302 may trigger a user interface prompt that is pre-populated with meeting-specific data to assist with correlating content with a specific electronically scheduled meeting. In other non-limiting examples, the user interface notification, shown in processing device view 310, may be the result of actions through specific applications/services (e.g., productivity application/service), such as those shown in FIGS. 3C-3G.

The user interface notification shown in processing device view 310 comprises a first user interface element 312 providing a representation of content (e.g., whiteboard image content) that a user may wish to associate with a meeting and/or share with other users. The content in the representation may be content that is currently being accessed by a user or content that was captured and/or contextually relevant to the meeting (e.g., title, topics, keywords, content, electronic documents). In some cases, the user may manually select content for sharing. In other cases, processing operations described herein may be executed to pre-populate a user interface prompt with relevant content, for example, based on a confidence analysis that indicates a correlation between content and a meeting.

The user interface prompt, shown in processing device view 310, may further comprise a second user interface element 314 providing a correlation with a meeting (e.g., electronically scheduled meeting). The second user interface element 314 may be pre-populated with specific data for an electronically scheduled meeting, selected based on automated evaluation of signal data or may be manually selected by a user. In some alternative examples, a user account may be associated with multiple electronically scheduled meetings, where additional user interface prompts may be presented through a user interface to enable disambiguation of confidence level determinations for correlating content with a specific meeting. In the non-limiting example shown in processing device view 310, the second user interface element 314 identified a title for the shared content ("Jack and Greg Sync"), imported from an active meeting. The pre-populated title also identifies a type of the content (e.g., "whiteboard" for whiteboard image content) to further assist users with identifying how the content ties into a meeting. Alternative means for pre-populating naming conventions may also exist without departing from the spirit of the present disclosure.

Moreover, the user interface prompt may further comprise a third user interface element 316, that identifies recipients for whom to share the content. The recipients may be derived from evaluation of signal data for an electronically scheduled meeting, where recipients may comprise invitees or attendees to an electronically scheduled meeting. Developers may configure rules for pre-populating user interface prompts based on an attendee status including but not limited to: all invitees; users who have indicated that they will be attendees to the meeting; users who have declined attendance to the meeting; users who have tentatively accepted an electronic meeting invite; users who have not yet responded to an electronic meeting invite, and any combination thereof, among other examples.

The user interface prompt may further comprise a fourth user interface element 318 that enables a user to easily share content with other users. For instance, when a user selects to send a sharing notification, via fourth user interface element 318, content may be automatically shared with the designated recipients. In some examples, a user may be sharing content through a distributed storage application/service, where content may be saved (or backed up) on distributed storage associated with a user account (or an account for a group of users). In such examples, shared content may be associated with a specific storage or directory (e.g., folder) that is associated with content for an electronically scheduled meeting. This may occur in addition to sharing the content directly with other user accounts that are associated with the recipients. In other instances, a copy of shared content may be stored locally on a computing device associated with a user.

FIG. 3C presents processing device view 320, illustrating another example of a proactive suggestion for sharing of content in association with a scheduled meeting. The example shown in processing device view 320 is an alternative type of proactive notification that can be surfaced on behalf of a user. The proactive notification 302, shown in FIG. 3A, is a suggestion that identifies a correlation between a specific type of accessed content (e.g., whiteboard image) and an electronically scheduled meeting. As compared with the proactive notification 302, shown in FIG. 3A, the proactive notification 322, shown in FIG. 3C, is a more generalized notification that serves as a reminder that the user is in a meeting and sharing of content may be most relevant before the lapse of a temporal period. For instance, if a user forgets to upload content during an occurrence or a meeting or directly after, the likelihood of them adding relevant content later in time greatly decreases. This can lead to inefficiency for users as well as inefficient operation of computing device resources where users may have to go searching for relevant content.

FIG. 3D presents processing device view 330, illustrating a user interface example where a user is actively initiating capture of content (e.g., image, video, audio, handwritten input) through a productivity application/service. A non-limiting example of a productivity application/service is a distributed data storage application/service, which may comprise user interface features to enable users to manage content associated with its user account. As an example, a user may select (operation 332) a user interface element to initiate capture of content. A user may wish to capture content during an occurrence of an electronically scheduled meeting or within a predetermined time window/period associated with the electronically scheduled meeting.

FIG. 3E presents processing device view 340, illustrating a continued user interface example from the example shown in processing device view 330 (FIG. 3D). In processing device view 340, a user interface of a productivity application/service is configured to enable the user to actively capture content. In the example show, the user is attempting to capture image content from a whiteboard. The user has selected (operation 342) to enter a specific mode for content capture (e.g., whiteboard mode) to best capture the content. The user may then execute a second selection (operation 344) to capture specific content. In the example shown, operation 344 relates to the selection of a photo capture button to capture an image of a whiteboard.

Examples described herein may be configured to work with any type of mode for content capture without departing from the spirit of the present disclosure. Additionally, different productivity applications/services may have different modes for capture of content, where any type of content can be captured and then successively analyzed for correlation to a meeting. Non-limiting examples of content capture modes have been described in the foregoing description. Processing operations described herein, related to evaluation of signal data associated with access to content (e.g., capture of content) may utilize signal data relate to the type of mode in which content was captured to assist with confidence determinations when correlating content with signal data for an electronically scheduled meeting. For instance, a whiteboard image may be more applicable to a brainstorming meeting then a video of a user taking his dog for a walk.

Figure 3F:
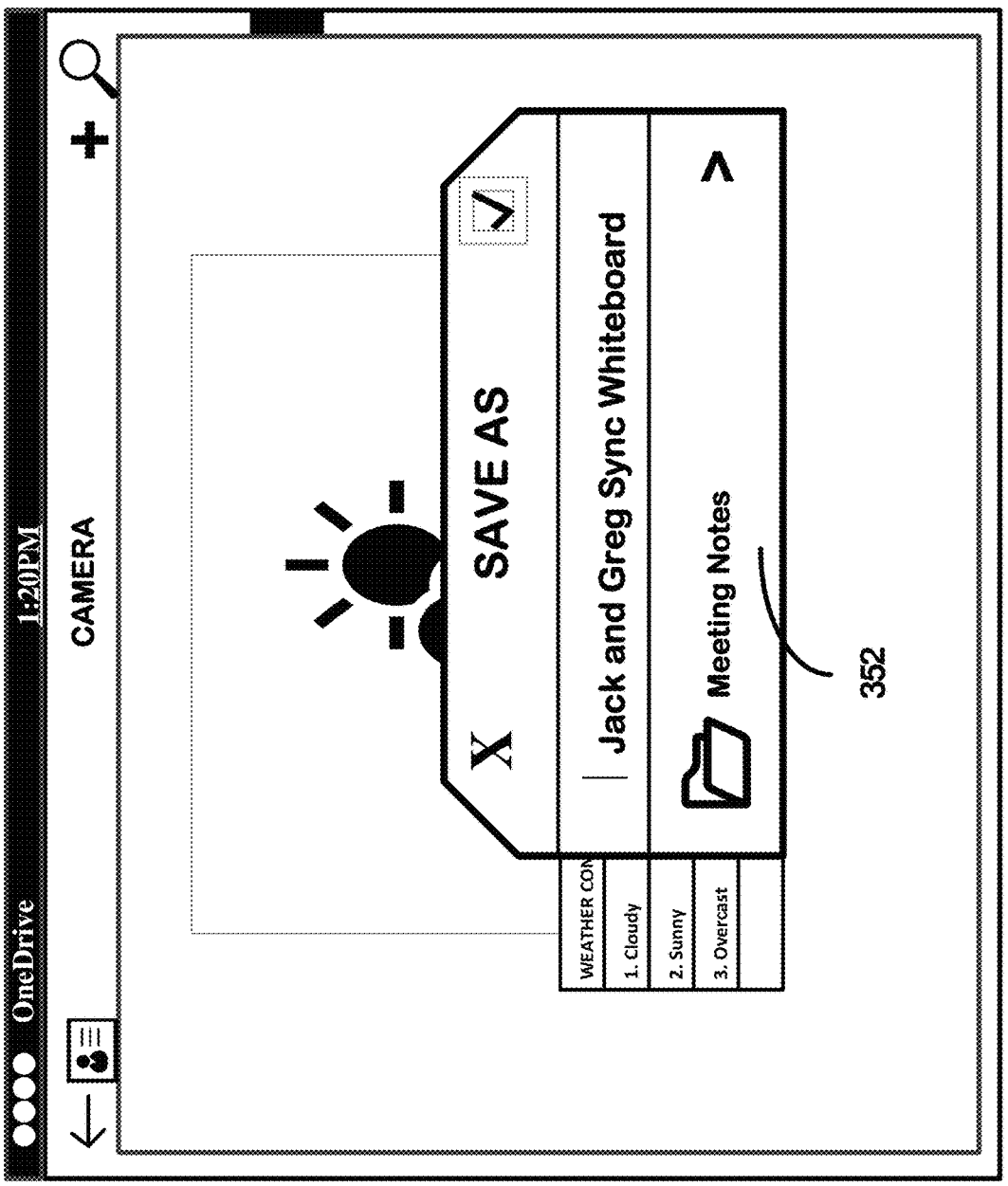

FIG. 3F presents processing device view 350, illustrating a continued user interface example from the example shown in processing device view 340 (FIG. 3E). In processing device view 352, a user interface save prompt 352 is proactively surfaced for a user to assist with saving the capture image content. For instance, correlation evaluation described herein may correlate the capture of the image content with an occurrence of an electronically scheduled meeting. Such analysis enables an application/service to proactively pre-populate the user interface save prompt 352 with meeting-specific data so that the user may not have to manually associate the content with meeting. In the example shown, a title for the captured content is pre-populated ("Jack and Greg Sync Whiteboard") which correlates the captured whiteboard image with an occurrence of an electronically scheduled meeting. Additionally, signal data correlation between content and an electronically scheduled meeting may also enable an application/service to pre-populate a save path or directory for storing the captured content. For instance, the captured content may be saved to a folder associated with meeting content for a specific meeting (e.g., "Jack and Greg Sync").

Figure 3G:
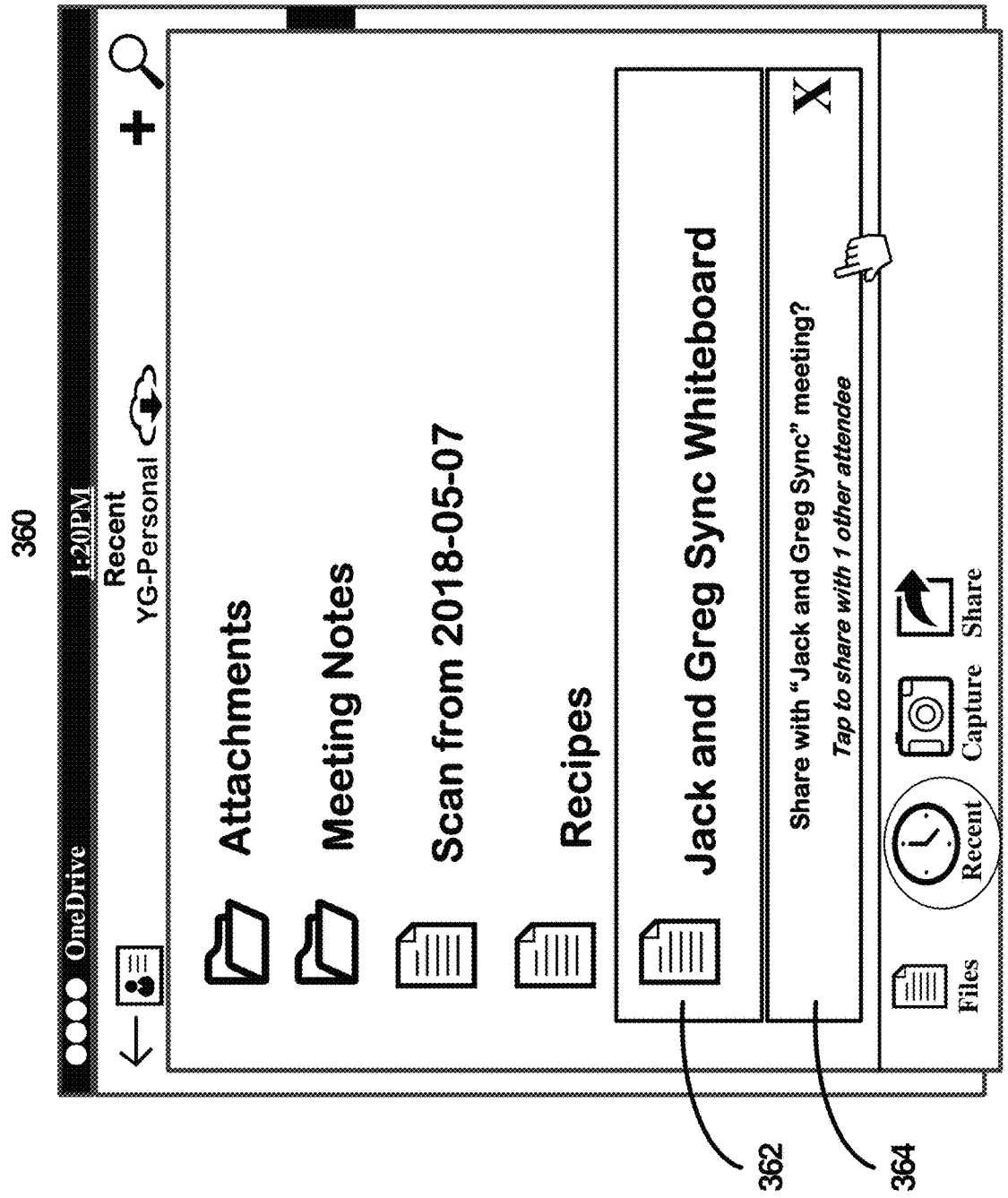

FIG. 3G presents processing device view 360, illustrating yet another example of a proactive suggestion for sharing of content in association with a scheduled meeting. Processing device 360 may be continued example of processing shown in processing device view 350 (FIG. 3F), where the user has saved captured content 362 to storage associated with its user account. In the example shown, a sharing notification 364 is proactively provided on behalf of the user, alerting the user of the opportunity to share content with other attendees of the correlated meeting. A user may select the sharing notification 364 to initiate automated processing to share the specific content with identified attendees. In one such example, the user may be prompted with additional user interface prompts such the user interface notification shown in processing device view 310 (FIG. 3B). This may enable the user to tailor a sharing link to its liking.

FIG. 4 illustrates a computing system suitable for implementing processing operations described herein related to management of proactive suggestion(s) for sharing of meeting content, with which aspects of the present disclosure may be practiced. Computing system 401, which is representative of any system or collection of systems in which the various applications, services, scenarios, and processes disclosed herein may be implemented. Examples of computing system 401 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, portable electronic devices, smart televisions, smart watches and other wearable devices, as well as any variation or combination thereof.

Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more services. Computing system 401 may comprise a collection of devices executing processing for front-end applications/services, back-end applications/service or a combination thereof. Computing system 401 comprises, but is not limited to, processing system 402, storage system 403, software 405, communication interface system 407, and user interface system 409. Processing system 402 is operatively coupled with storage system 403, communication interface system 407, and user interface system 409. Processing system 402 loads and executes software 405 from storage system 403. Software 405 includes one or more software components (e.g., 406a and 406b) that are configured as meeting sharing component(s) 406a and application/service components 406(b) (e.g., productivity application/service components). Examples of such components, including executable processing operations, have been described in the foregoing description. In some examples, computing system 401 may be a computing device that a user utilizes to access content and/or connect to an electronic meeting. Computing system 401 may be configured for provision of an adapted user interface, that is improved over traditional user interfaces, where a user interface may be tailored to enable proactive suggestions for sharing of meeting content as described herein. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, graphical processing units, application specific processors, and logic devices, as well as any other type of processing device, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for implementing software components, hardware components or a combination thereof. In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein (including productivity applications/services).

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
analyzing signal data associated with an electronic meeting invite of an electronically scheduled meeting for a user account that is an attendee for the electronically scheduled meeting, wherein the analyzing of the signal data comprises:
detecting an occurrence of the electronically scheduled meeting, and
detecting an attendance status of invitees associated with the electronic meeting invite of the electronically scheduled meeting;
detecting that image content is captured during the occurrence of the electronically scheduled meeting by a computing device associated with the user account;
after detecting that a predetermined time period has elapsed after the electronically scheduled meeting time has concluded, automatically generating a message prompt configured to aid sharing of the image content with one or more invitees of the electronically scheduled meeting, wherein the automatically generating of the message prompt comprises pre-populating the message prompt with an identification of the image content and contact data for the one or more invitees based on the detected attendee status of the invitees from the electronic meeting invite; and
presenting, through a user interface of an application or service, the message prompt.

2. The method of claim 1, further comprising: parsing meeting details associated with the electronic meeting invite of the electronically scheduled meeting, and wherein the presenting comprises pre-populating the message prompt with contact data for one or more invitees that have accepted the electronic meeting invite for the electronically scheduled meeting based on a result of the parsing of the meeting details associated with the electronic meeting invite.

3. The method of claim 1, further comprising: analyzing the image content and data associated with the image content, wherein the detecting that the image content is captured comprises correlating of the image content with the electronically scheduled meeting by matching a timestamp of a capture time of the image content with a timestamp associated with the occurrence of the electronically scheduled meeting.

4. The method of claim 1, wherein the analyzing of the signal data further comprises parsing meeting details associated with the electronic meeting invite of the electronically scheduled meeting, and wherein the user interface prompt is further pre-populated with a meeting name for the electronically scheduled meeting based on a result of the parsing of the meeting details.

5. The method of claim 1, wherein the analyzing of the signal data further comprises parsing meeting details associated with the electronic meeting invite of the electronically scheduled meeting, and the method further comprising: surfacing a user interface save prompt, through a user interface of a distributed storage application or service after the predetermined time period has elapsed after the electronically scheduled meeting time has concluded, to save the image content to a storage folder associated with the electronically scheduled meeting, and wherein the user interface save prompt is automatically pre-populated with a meeting name, for the electronically scheduled meeting, as the storage folder based on a result of the parsing of the meeting details of the electronic meeting invite.

6. The method of claim 1, wherein the detecting that the image content is capture further comprises detecting that the image content is actively captured through a mode of operation of a distributed storage application or service, and wherein the method further comprising: collecting the signal data associated with the electronically scheduled meeting from the distributed storage application or service, and wherein the analyzing analyzes the signal data collected from the distributed storage or service in detecting that the image content is captured during the occurrence of the electronically scheduled meeting.

7. The method of claim 1, wherein the detecting that the image content is capture further comprises detecting access to captured image content through a camera application or service, and wherein the method further comprising: collecting the signal data associated with the electronically scheduled meeting the camera application or service and wherein the analyzing analyzes the signal data collected from the camera application or service in detecting that the image content is captured during the occurrence of the electronically scheduled meeting.

8. The method of claim 7, wherein the presenting presents the user interface prompt as a notification through the user interface of a distributed storage application or service.

9. The method of claim 1, wherein the analyzing of the signal data further comprises parsing meeting details associated with the electronic meeting invite of the electronically scheduled meeting to identify a title of the electronically scheduled meeting, and wherein the message prompt provides, as the identification of the image content, a name for the image content that includes the title of the electronically scheduled meeting.

10. The method of claim 1, wherein the message prompt is a reminder to a user to associate the image content with a specific file repository corresponding with the electronically scheduled meeting, and wherein the message prompt comprises text identifying the reminder to the user to associate the image content with the specific file repository for the electronically scheduled meeting.

11. A system comprising:
at least one processor; and
a memory, operatively connected with the at least one processor, storing computer-executable instructions that, when executed by the at least one processor, causes the at least one processor to execute a method that comprises:
analyzing signal data associated with an electronic meeting invite of an electronically scheduled meeting for a user account that is an attendee for the electronically scheduled meeting, wherein the analyzing of the signal data comprises:
detecting an occurrence of the electronically scheduled meeting, and
detecting an attendance status of invitees associated with the electronic meeting invite of the electronically scheduled meeting;
detecting that image content is captured during the occurrence of the electronically scheduled meeting by a computing device associated with the user account;
after detecting that a predetermined time period has elapsed after the electronically scheduled meeting time has concluded, automatically generating a message prompt configured to aid sharing of the image content with one or more invitees of the electronically scheduled meeting, wherein the automatically generating of the message prompt comprises pre-populating the message prompt with an identification of the image content and contact data for the one or more invitees based on the detected attendee status of the invitees from the electronic meeting invite; and
presenting, through a user interface of an application or service, the message prompt.

12. The system of claim 11, wherein the method, executed by the at least one processor, further comprises: parsing meeting details associated with the electronic meeting invite of the electronically scheduled meeting, and wherein the presenting comprises pre-populating the message prompt with contact data for one or more invitees that have accepted the electronic meeting invite for the electronically scheduled meeting based on a result of the parsing of the meeting details associated with the electronic meeting invite.

13. The system of claim 11, wherein the method, executed by the at least one processor further comprises: analyzing the image content and data associated with the image content, wherein the detecting that the image content is captured comprises correlating of the image content with the electronically scheduled meeting by matching a timestamp of a capture time of the image content with a timestamp associated with the occurrence of the electronically scheduled meeting.

14. The system of claim 11, wherein the analyzing of the signal data further comprises parsing meeting details associated with the electronic meeting invite of the electronically scheduled meeting, and wherein the user interface prompt is further pre-populated with a meeting name for the electronically scheduled meeting based on a result of the parsing of the meeting details.

15. The system of claim 11, wherein the analyzing of the signal data further comprises parsing meeting details associated with the electronic meeting invite of the electronically scheduled meeting, and the method further comprising: surfacing a user interface save prompt, through a user interface of a distributed storage application or service after the predetermined time period has elapsed after the electronically scheduled meeting time has concluded, to save the image content to a storage folder associated with the electronically scheduled meeting, and wherein the user interface save prompt is automatically pre-populated with a meeting name, for the electronically scheduled meeting, as the storage folder based on a result of the parsing of the meeting details of the electronic meeting invite.

16. The system of claim 11, wherein the detecting that the image content is capture further comprises detecting that the image content is actively captured through a mode of operation of a distributed storage application or service, and wherein the method further comprising: collecting the signal data associated with the electronically scheduled meeting from the distributed storage application or service, and wherein the analyzing analyzes the signal data collected from the distributed storage or service in detecting that the image content is captured during the occurrence of the electronically scheduled meeting.

17. A method comprising:
analyzing signal data associated with an electronic meeting invite of an electronically scheduled meeting for a user account that is an attendee for the electronically scheduled meeting, wherein the analyzing of the signal data comprises:
detecting a scheduled meeting time for the electronically scheduled meeting from the electronic meeting invite, and
detecting an attendance status of invitees for the electronic meeting invite of the electronically scheduled meeting;

detecting that image content is captured during the occurrence of the electronically scheduled meeting by a computing device associated with the user account;

after detecting that a predetermined time period has elapsed after the electronically scheduled meeting time has concluded, automatically generating a sharing notification for the user account that comprises a reminder to associate the content with the electronically scheduled meeting that comprises a reminder to associate the content with the electronically scheduled meeting, wherein automatically generating of the sharing notification comprises pre-populating the sharing notification with an identification of the image content and contact data for the one or more invitees based on the detected attendee status of the invitees from the electronic meeting invite; and presenting, through a user interface of an application or service, the sharing notification.

18. The method of claim 17, further comprising: analyzing the image content and data associated with the image content, wherein the detecting that the image content is captured comprises correlating of the image content with the electronically scheduled meeting by matching a timestamp of a capture time of the image content with a timestamp associated with the occurrence of the electronically scheduled meeting.

19. The system of claim 11, wherein the analyzing of the signal data further comprises parsing meeting details associated with the electronic meeting invite of the electronically scheduled meeting to identify a title of the electronically scheduled meeting, and wherein the message prompt provides, as the identification of the image content, a name for the image content that includes the title of the electronically scheduled meeting.

20. The system of claim 11, wherein the message prompt is a reminder to a user to associate the image content with a specific file repository corresponding with the electronically scheduled meeting, and wherein the message prompt comprises text identifying the reminder to the user to associate the image content with the specific file repository for the electronically scheduled meeting.

* * * * *